US006808118B2

(12) United States Patent
Field

(10) Patent No.: US 6,808,118 B2
(45) Date of Patent: Oct. 26, 2004

(54) SECURITY CODE VERIFICATION FOR IDENTIFICATION CARDS

(75) Inventor: Gary Field, Portsmouth, RI (US)

(73) Assignee: Zebra Atlantek, Inc., Wakefield, RI (US)

(*) Notice: Subject to any disclaimer, the term of this patent is extended or adjusted under 35 U.S.C. 154(b) by 0 days.

(21) Appl. No.: 10/316,561

(22) Filed: Dec. 11, 2002

(65) Prior Publication Data

US 2003/0121987 A1 Jul. 3, 2003

Related U.S. Application Data

(60) Provisional application No. 60/344,917, filed on Dec. 31, 2001.

(51) Int. Cl.[7] .............................................. G06K 19/06
(52) U.S. Cl. ....................... 235/494; 235/375; 235/380; 235/382
(58) Field of Search ................................ 235/494, 375, 235/380, 382, 469, 487, 491; 283/67, 93, 70; 380/23, 24, 25, 49, 54

(56) References Cited

U.S. PATENT DOCUMENTS

| | | | | | |
|---|---|---|---|---|---|
| 3,567,909 | A | * | 3/1971 | Allen | 235/469 |
| 4,476,382 | A | * | 10/1984 | White | 235/491 |
| 4,687,526 | A | * | 8/1987 | Wilfert | 156/64 |
| 4,814,594 | A | * | 3/1989 | Drexler | 235/487 |
| 4,972,476 | A | * | 11/1990 | Nathans | 713/186 |
| 5,380,044 | A | * | 1/1995 | Aitkens et al. | 156/277 |
| 5,471,533 | A | * | 11/1995 | Wang et al. | 705/75 |
| 5,522,623 | A | * | 6/1996 | Soules et al. | 283/81 |
| 5,598,474 | A | * | 1/1997 | Johnson | 713/186 |
| 5,637,851 | A | * | 6/1997 | Swartz et al. | 235/462.2 |
| 5,774,879 | A | * | 6/1998 | Custy et al. | 705/35 |
| 5,841,555 | A | * | 11/1998 | Bianco et al. | 359/2 |
| 5,930,450 | A | * | 7/1999 | Fujita | 386/95 |
| 5,951,055 | A | * | 9/1999 | Mowry, Jr. | 235/494 |
| 6,057,864 | A | * | 5/2000 | Wen | 346/140.1 |
| 6,104,812 | A | * | 8/2000 | Koltai et al. | 380/51 |
| 6,124,945 | A | * | 9/2000 | Ishihara et al. | 358/1.9 |
| 2002/0040929 | A1 | | 4/2002 | Bramucci | |

OTHER PUBLICATIONS

Bramucci, Interactive playing/trading card system, Apr. 11, 2002, U.S. patent application Publication.*

* cited by examiner

Primary Examiner—Karl D. Frech
Assistant Examiner—Kimberly D. Nguyen
(74) Attorney, Agent, or Firm—Alston & Bird LLP

(57) ABSTRACT

A process for printing ID cards having a uniquely encoded security authentication component, where an ID card is created having a unique covert code embedded thereon that includes a verifiable fingerprint, which allows the card to be authenticated. A code is included into the image printed on the face of the card that contains important and relevant information pertaining to the time and place of card issue such as the printer manufacturer, issuing authority, time at which the card was printed, date when the card was printed and the printer serial number. The code uses specifically identified printed pixels in a predictable location on the face of the ID card. The pixels in the code location have specific colors that correspond to numbers.

15 Claims, 3 Drawing Sheets

SECURITY CODE VERIFICATION FOR IDENTIFICATION CARDS

CROSS-REFERENCE TO RELATED APPLICATIONS

This application is related to and claims priority from earlier filed provisional patent application No. 60/344,917, filed Dec. 31, 2001.

BACKGROUND OF THE INVENTION

The present invention relates to a process for printing ID cards having a uniquely encoded security authentication component. More specifically, the present invention relates to a process and an ID card formed thereby, where an ID card is created having a unique covert code embedded thereon that provides a verifiable fingerprint, which allows the card to be authenticated.

The present invention was developed in respond to a meeting that was held at the US Secret Service headquarters in Washington, D.C. on Dec. 19–20, 2001. The meeting was attended by representatives from the Secret Service and approximately sixty consultants from private industries. The meeting was organized by the Industry Advisory Board of the American Association of Motor Vehicle Administrators to discuss driver's license security issues. The Secret Service stated that while they had various means of analyzing paper documents to determine the equipment that had produced the document, they complained that they have no way to trace documents that had been produced on a dye sublimation printer. Specifically, they requested that the industry develop some means of "fingerprinting" documents produced in desktop ID printers that use a dye sublimation printing process.

In the prior art, many different forms of ID cards include different types of security microprinting using certain words in the background of the ID. This is also a common feature on US and other foreign currencies and other forms of negotiable paper such as certified checks. In general, the microprinting appears as a kind of watermark on the background of the ID or may be imbedded into a shape contained on the ID card. For example, the Commonwealth of Massachusetts may microprint "Commonwealth of Massachusetts Official Document" across the entire background of the card in a diagonal pattern. Another example is the pattern placed in the background of a certified check that appears as the word void if the check is electronically scanned or copied. Typically, printing of this type is placed on the raw card stock itself when the raw stock is made and shipped to the issuing authority where the personalized information is printed onto the card at the card issuance location. In general, therefore, the microprinting is provided on the blank card stock when the card stock is received at the card issuance location.

The difficulty with applying this type of microprinting as described in the prior art is that it is typically completed using a single pass operation of black ink. While single pass printing is very clear and readable, it is also easily repeatable using most thermal printing technologies available on the market today. As a result, it is easy for counterfeiters to reproduce the microprinting security feature onto raw card stock and then apply the personalized ID information onto the card in a separate operation, thereby circumventing the security of the card. The other issue is that since the micro printing is placed onto the card stock at the point of manufacture, it is possible for a counterfeiter to obtain raw stock as the material passes through various warehousing, shipping and storage operations. In this manner, it is easy for a counterfeiter to create fraudulent ID cards simply by printing the desired personal information onto the raw cards that they obtain. Finally, there is currently no manner by which an ID card can be fingerprinted, thereby allowing the card to be matched to the printer on which it was printed. This feature is considered important when fraudulent ID cards are discovered to allow them to be traced to their point of origin.

There is therefore a need for an identification card that includes a microprinted security feature that overcomes the above noted drawbacks while producing a card that includes a code that is difficult to reproduce at a location other than the card issuance location. Specifically, there is a need for an ID card with a microprinted security feature that is applied at the time and place of the card issuance that cannot be easily reproduced using readily available imaging technology while also creating a fingerprint by which that card can be traced to its point of origin.

BRIEF SUMMARY OF THE INVENTION

In accordance with the present invention, a printed security feature is applied to the ID card at the issuance location at the time the card is issued. The current invention therefore also provides for a unique process of producing an ID card that includes an imbedded security feature, which is applied at the time and place that the card is issued. Specifically, the present invention provides for a process of producing an ID card having an imbedded security code that is generated and specifically matched to the particular printer on which the ID is printed that is applied at the time and place that the card is issued thereby providing a code by which the authenticity of the ID card can be cross verified.

Card issuance locations typically utilize a high quality three pass thermal color printing process to achieve color images on the ID cards that they issue. Given that the layout for a driver's license or an ID card can be configured into any of an infinite number of combinations of colors and patterns, it is difficult to embed codes that can be quickly identified by a person who is educated with respect to the code while concealing them from the casual observer. In this respect, the general concept of the present invention is applicable in a broad manner, but would require a governmental mandate to create a standard that identified a small and definite area of the card, which can then be used for incorporating the coding system of the present invention.

The fingerprinting system of the present invention requires that a code be included into the image printed on the face of the card that is difficult to see with the naked eye. The code must be unobtrusive while effectively disappearing into the background printing on the card and not obscuring any existing characteristics. The code contains important and relevant information pertaining to the time and place of card issue such as the printer manufacturer, issuing authority, time at which the card was printed, date when the card was printed and the printer serial number.

The code as will be further described below in detail provides for the use of specifically identified printed pixels in a predictable location on the face of the ID card. The pixels in the code location include specific colors that correspond to numbers. Once the code is converted from colors to numbers, the position of each number further corresponds to a specific piece of relevant identification data thereby providing a fingerprint on the ID card. The imbedded code is further obscured from the casual observer by only using one pixel periodically along a printed row of pixels, for example one out of each ten. In this manner, a person that is not aware of the code would not be able to see or translate the code.

The benefits to the ID cards and the process used in the present invention are two fold. The first benefit is that the raw cards do not have to be pre-printed with the security-coded printing. This saves on processing costs by eliminating an additional handling and printing step while also reducing the possibility that prepared cards may be obtained by counterfeiters. Secondly, since the encoded information contained on each card provides a unique fingerprint that is specific to the time and place where the card was issued, it becomes more difficult for counterfeiter to reproduce an ID card that would properly include this encoded information. Fake cards become immediately detectable because of a lack of the encoded information or the print code contained thereon would not match the proper code that was expected to be found thereon.

The process of the present invention therefore includes providing a blank piece of card stock for printing, encoding the information relating the current print job and printing an image onto the ID card that includes the imbedded code fingerprint. In addition, the present invention includes the ID card end product that is produced using the process of the present invention.

Accordingly, one of the objects of the present invention is the provision of an ID card that includes an integrally embedded printed security fingerprint feature that is applied at the time and place of card issuance. Another object of the present invention is the production of an ID card that includes a security code that acts as a fingerprint to identify the time and place of card issue in addition to the specific printer used for card issue. A further object of the present invention is the provision of an ID card that is resistant to counterfeiting due to the inclusion of a unique fingerprint that is related to the time, date and location of issuance of the ID card thereby allowing the authenticity of the card to be verified. Yet a further object of the present invention, is the provision of a process whereby an ID card is produced to include a unique fingerprint feature that is imbedded in the image of the card at the time and place of card issuance that can be used to identify the issuing authority for verification of the authenticity of the ID card.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
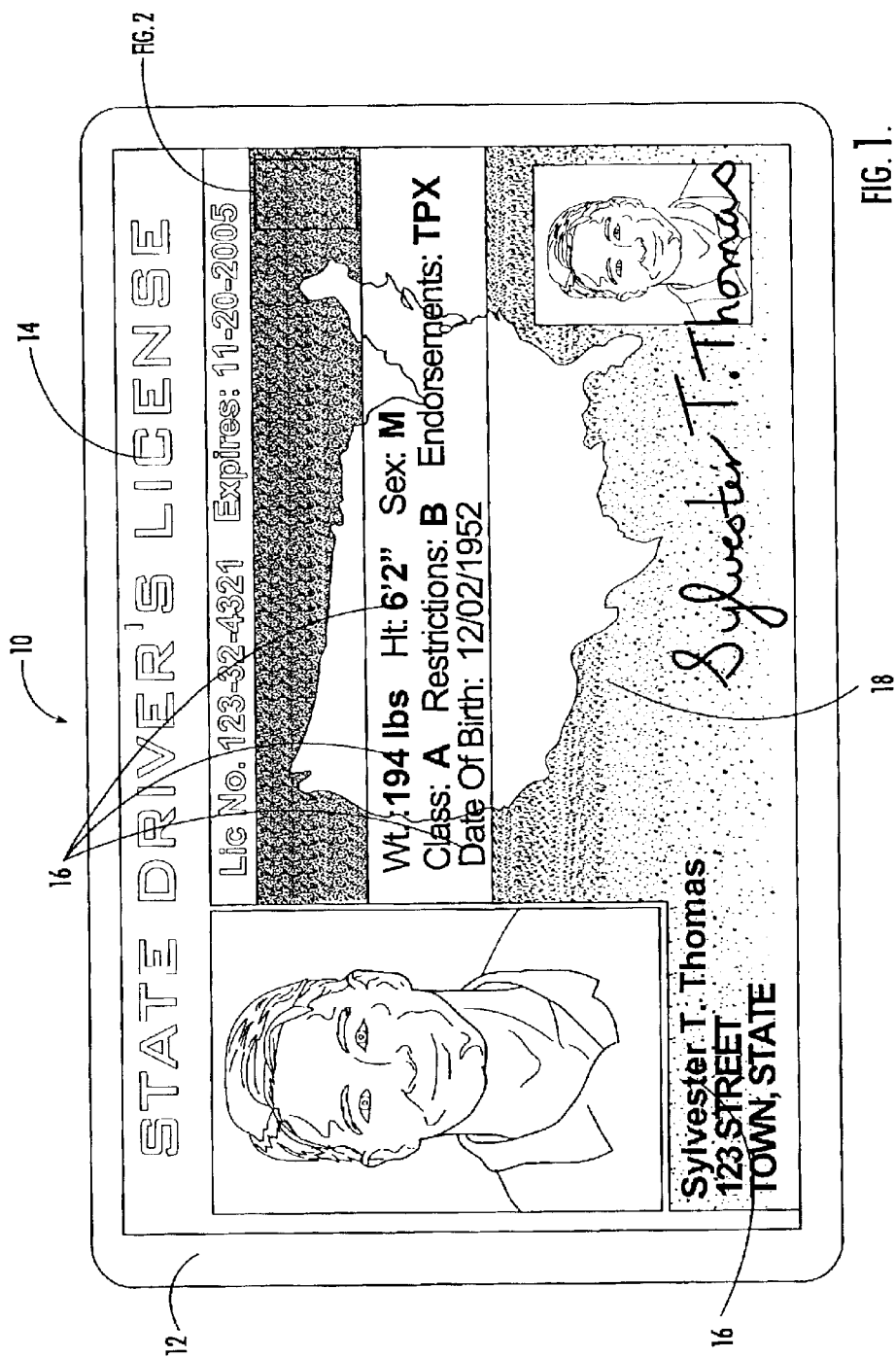
FIG. 1 is front view of the identification card of the present invention.

Referring now to the drawings, the identification card of the present invention is illustrated and generally indicated at 10 in FIG. 1. The ID card 10 has a substrate 12 with indicia printed thereon. Portions of the indicia on the ID card 10 are specially placed and printed to enhance the security of the ID and deter the manufacture of counterfeit ID's as will be more fully described below. Further, the present invention provides for a method of manufacturing an ID card 10 that includes security printing that is placed onto the ID card 10 at the time and place of the issuance of the ID card 10 also further deterring the manufacture of counterfeit ID cards 10 and providing a unique fingerprint for each ID card 10 as will also be described below. The present invention therefore provides a convenient and economical ID card 10 that is easy to produce while providing enhanced features that deter fraudulent issuance of fake ID cards 10 that has not been previously available in the prior art.

Turning to FIG. 1, the front of the ID card 10 of the present invention is shown. Typically, the card 10 includes a substrate material 12 onto which the relevant card features and information is printed. The substrate 12 may consist of a variety of constructions. In the preferred embodiment, the substrate 12 is a rigid plastic material onto which the indicia are printed directly. Further, the card 10 may include additional features such as a clear overlay (not shown) to further protect the printed indicia. Finally, the card 10 may also include a laminated cover (not shown) over the entire front and back surface of the card 10 to further protect the card 10 and prevent alteration of the front of the card. In addition, the substrate 12 onto which the card is printed is not limited to plastic but may also include paper or cardboard or any other sheet material suitable for printing as is known in the art.

The face of the ID card 10 includes several different types of printed indicia. These indicia can be divided into three general categories. The first is the issuing authority information 14. This includes the generic information that is the same regardless of the person to whom the card 10 is issued and includes for example, the name of the issuing authority, the purpose of the ID, etc. This generic information 14 is maintained within the image file that is printed onto the card 10 and is combined with the other two categories of indicia for printing onto the ID card 10.

The second category of indicia is the biometric information 16 that is specific to each recipient of the ID card 10. This biometric information 16 includes the user's name, address, weight, height, date of birth, picture, signature, etc. and is customized to match the profile of each user to whom an ID card 10 is issued. This information is also included into the overall image to be printed onto the ID card 10.

The final category of indicia printed onto the ID card 10 is the security printing features 18. This component is critical to the present invention. The security printing features 18 of the present invention are printed in predetermined locations on the card 10. Specifically, the security indicia 18 is provided as a printed code that is imbedded into the other indicia printed on the face of the card that creates a unique fingerprint for the ID card 10 that is undetectable by the unaided eye. The code 18 is formed using a pattern of colored pixels 20 that are placed in a specific position and in a specific arrangement. Generally, each of the pixels 20 included in the code 18 represent a numeral from 0–9 that corresponds to the color of the pixel 20. Therefore, the code 18 is a numeric code in which the number 0–9 is represented by a group of individual pixels 18, each having one of ten predetermined and distinct colors that each corresponds to a numeral. In the preferred embodiment the color-coding used is the same as the existing standard resistor color code as provided below in Table 1.

TABLE 1

| | Color | | | | | | | | | |
|---|---|---|---|---|---|---|---|---|---|---|
| | Black (Bk) | Brown (Bn) | Red (R) | Orange (O) | Yellow (Y) | Green (Gn) | Blue (Bl) | Violet (V) | Gray (Gy) | White (W) |
| Number | 0 | 1 | 2 | 3 | 4 | 5 | 6 | 7 | 8 | 9 |

The present invention therefore provides for placing specifically colored pixels 20 into specific locations within the printed indicia on the ID card 10. Since these imbedded pixels 20 need to be identified in some manner to differentiate them from the other pixels 22 used to form the other printed indicia, the present invention also provides for a start character 24 and an end character 26 to allow the person trying to identify the particular code 18 to find and identify the code 18 within the pattern of pixels 22 on the face of the card 10. For the purpose of this description, these start 24 and end codes 26 will be a double yellow pixel. While this scheme is described herein, it is not meant to be limiting, as the start code 24 and end code 26 could be any identifiable color or configuration.

Figure 2:
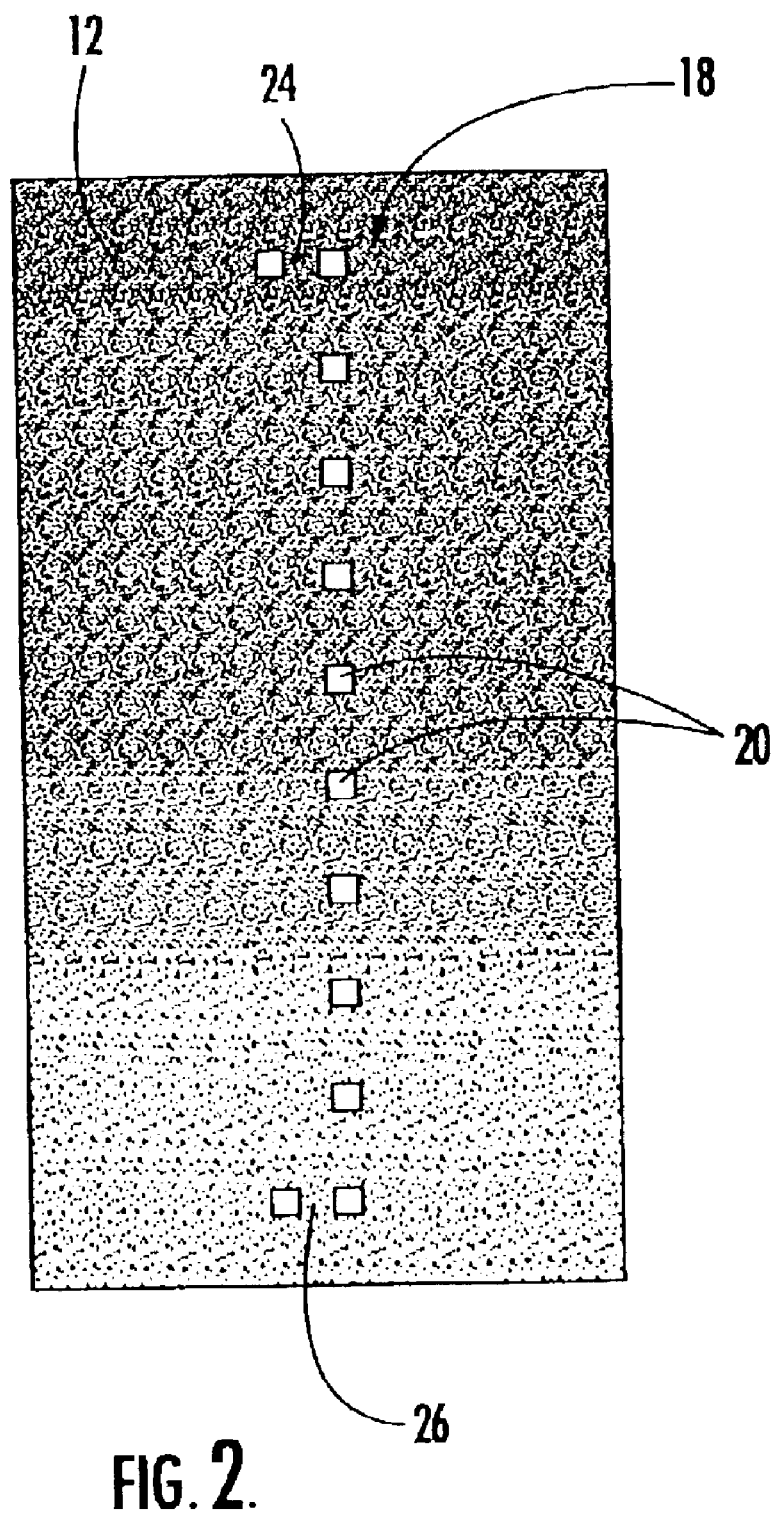
FIG. 2 is a close up view of the area of the ID card having the security printing thereon.

Turning now to FIG. 2 the embedded code 18 of the present invention can be seen in an exploded view of the coded area of the card 10. To make the inclusion of the coded pixels 20 less noticeable to a casual observer, the pixels 20 used for the code 18 are not placed immediately adjacent to one another. Each pixel 20 of the code 18 will be placed in spaced relation to one another by a predetermined and fixed number of standard image pixels 22. The pixels 22 that are placed between the code 18 pixels 20 are the pixels 22 used to form the image of the other printed indicia on the face of the ID card 10. In this manner, the pattern of pixels 20 that form the security code 18 are less noticeable because each pixel 20, while not necessarily in harmony with the surrounding pixels 22, is spaced apart from the other code pixels 20 by a fixed number of normal pixels 22, thereby eliminating a solid string of code pixels 20 that deviates from the rest of the image. For purpose of the preferred embodiment, each of the code pixels 20 are spaced apart by nine normal pixels 22 or, stated another way, one pixel printed out of every ten pixel positions is a code pixel 20. While a one in ten ratio is used for the preferred embodiment of the present invention, other pixel spacing where the coded pixels 20 are placed closer together or further apart are fully anticipated within the present disclosure.

Figure 3:
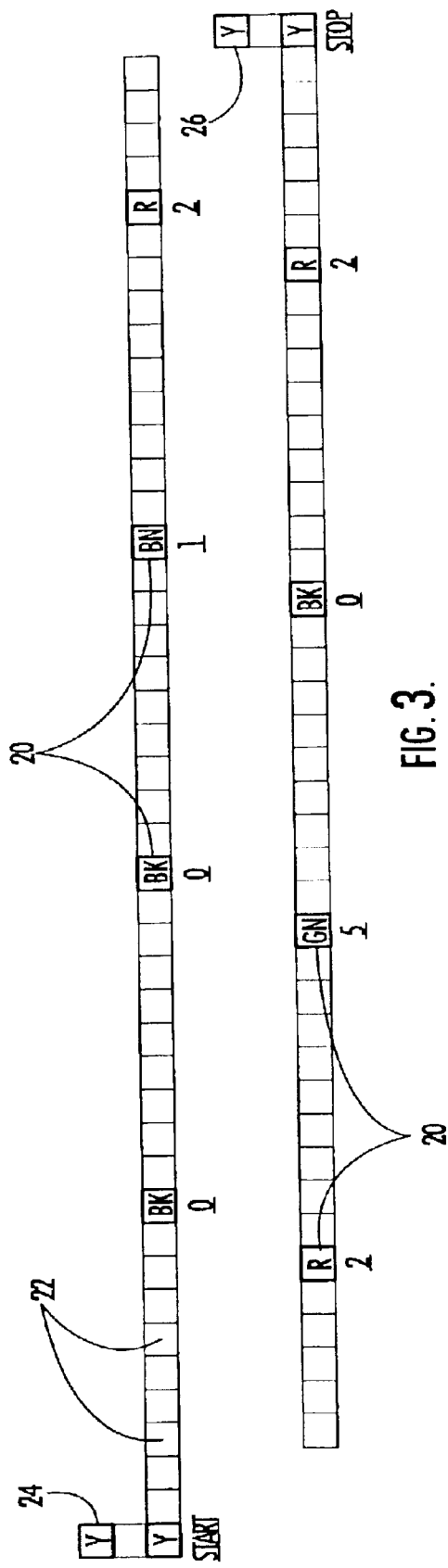
FIG. 3 is an expanded view showing the pixels of the embedded security code of the present invention.

Turning to FIG. 3, a sample code 18 is shown having eight digits. The code 10 location must first be identified on the ID card 10 and the start 24 and stop 26 codes located. As can be seen the start 24 and stop 26 codes are the double yellow pixels at the beginning and end of the chain. Next, each of the relevant code pixels 20 is identified. In this case, the code pixels 20 are spaced using a ten-pixel module, where every tenth pixel is relevant to the code 18. Then the colors or each code pixel 20 is read as the number 28 it represents using Table 1. The code 18 in FIG. 3 therefore is 00122502. Next, the code 18 is applied to the predetermined standardized data format. For example, in this code 18, the first two digits 28 represent the manufacturer of the printer and the next six digits 28 represent the print date of the ID card 10. The information provided by this code 18 is that the printer was manufactured by manufacturer 00 or Atlantek and the print date was Dec. 25, 2002. Given a standard image size for printing on an ID card 10 has a length dimension that includes 952 pixels, printing one pixel every ten positions would allow 95 different digits that correspond to relevant information to be stored along the long edge of the card 10. Codes 18 could be provided that include not only the manufacturer and print date but also the printer serial number, time of day, issuance location, etc. The actual format could be modified to include any data necessary. Further, if necessary the code 18 could be printed across more than one print line.

It is recognized that digital representations of color will vary in actual printed color tone over a population of operational printer hardware. Printed color will also vary when dyes from different manufacturers are used in the print process. In addition, there are also differences in the human eye's ability to recognize colors and discriminate between colors. This is particularly true when trying to differentiate between two colors that have a high degree of similarity such as orange and brown. In order to assist examiners in the ability to recognize and differentiate between colors used in the embedded security code 18, the first ten pixels printed in the code 18 will be the standard colors representing the numbers 0–9 in numeric order. In this manner, a calibration standard that is mated to the printer on which the ID card 10 was printed is provided for immediate comparison to determine the standard by which the code 18 was generated.

The indicia in all of the three above described categories, generic 14, biometric 16 and security 18, are all combined into a single image at the time and place of card issuance and printed onto the card substrate 12 in a single printing operation. The first benefit to producing the cards 10 in this manner is that the raw cards 10 do not have to be pre-printed with the security code 18 printing. This saves on processing costs by eliminating an additional handling and printing step while also reducing the possibility that prepared card stock may be obtained by counterfeiters during the warehousing, shipping or storing of the card stock. In addition, since the security code 18 is produced and embedded into the print image at the time the card 10 is printed, it is difficult for a counterfeiter to reproduce an ID card 10 having a properly coded security feature.

The process of the present invention includes the provision of a blank substrate material 12 that is placed into the feeding mechanism of a high precision three-pass thermal printer. A security code 18 is generated that corresponds to the specific information relating to the ID card 10. The numeric code 28 is converted to an array of corresponding colored pixels 20. An image file is produced that includes the generic issuance information 14, the biometric information of the recipient 16 having the array of pixels 20 relating to the security-code 18 embedded therein. The information is all combined and printed onto the card substrate 12 in one printing operation, thereby producing a finished ID card 10, ready for issuance. Verification of an ID card 10 would then simply require that the person seeking authentication identify and read the code 18 as described herein to obtain a fingerprint that is unique to the ID card 10.

It can therefore be seen that the present invention provides a unique ID card 10 and a method of producing the same that includes an integral security code feature 18 that reduces the ability of a counterfeiter to produce fraudulent ID cards 10. Specifically, the present invention provides for a method of producing an ID card 10 in a single printing operation that reduces the opportunity that raw card stock can be obtained for fraudulent purposes while enhancing the security of the finished product. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An identification card issued by an issuing authority comprising:

a substrate having a front surface;

printed indicia on said front surface of said substrate, said printed indicia formed from an array of colored pixels; and at least one designated area of said array of colored pixels arranged in a manner to form a visible embedded security code, the designated array of colored pixels representing numbers selected from within the range of zero to nine; wherein each selected number is represented by a different colored single pixel so that only the single colored pixel is read to determine the corresponding number, the authenticity of said security code verifiable by said issuing authority.

2. The identification card of claim 1, wherein said security code is a code that includes the time, date and issuance location of the identification card and the serial number of the printer on which the identification card was printed.

3. The identification card of claim 1, wherein said array of pixels defining said security code are distributed in a regular manner in said designated area of said printed indicia.

4. The identification card of claim 3, wherein said array of pixels is one pixel in each ten printed pixels.

5. The identification card of claim 3, wherein said array of pixels includes a first group of pixels representing a start position and a second group of pixels representing an end position and a distribution of code pixels in a pattern between said first and second group of pixels.

6. A method of manufacturing an identification card comprising:

providing a substrate having a front surface; and printing an array of colored pixels on said front surface of said substrate to form printed indicia, at least one designated area of said array of colored pixels arranged in a manner to form a visible embedded security code, the designated array of colored pixels representing numbers selected from within the range of zero to nine, wherein each selected number is represented by a different colored single pixel so that only the single colored pixel is read to determine the corresponding number, the authenticity of said security code verifiable by said issuing authority.

7. The method of manufacturing an identification card of claim 6, said step of printing further comprising:

printing an array of colored pixels on said front surface of said substrate wherein said array of colored pixels include two sets of colored pixels, a first set of colored pixels that form printed indicia and a second discrete set of colored pixels that form a security code, said second set of colored pixels being distributed in a predetermined pattern within said first set of colored pixels.

8. The method of manufacturing an identification card of claim 7, wherein said security code is a code that includes the time, date and issuance location of the identification card and the serial number of the printer on which the identification card was printed.

9. The method of manufacturing an identification card of claim 7, wherein the ratio between said first set of pixels and said second set of pixels is 10 pixels to 1 pixel.

10. The method of manufacturing an identification card of claim 7, wherein said pattern of said second set of pixels includes a first group of pixels representing a start position and a second group of pixels representing an end position and a distribution of code pixels in a pattern between said first and second group of pixels.

11. A method of manufacturing an identification card comprising:

providing a substrate having a front surface;

creating an image, said image formed from a first set of colored pixels corresponding to the biometric data and generic data related to said identification card and a second set of colored pixels corresponding to a security code, the second set of colored pixels representing numbers selected from within the range of zero to nine, wherein each selected number is represented by a different colored single pixel so that only the single colored pixel is read to determine the corresponding number, said second set of pixels being arranged within said first set of pixels in a predetermined pattern; and printing said image on said front surface of said substrate.

12. The method of manufacturing an identification card of claim 11, wherein said security code is a code that includes the time, date and issuance location of the identification card and the serial number of the printer on which the identification card was printed.

13. The method of manufacturing an identification card of claim 11, wherein said pattern of said second set of pixels defining said security code are distributed in a regular manner in said first set of pixels.

14. The method of manufacturing an identification card of claim 13, wherein said regular distribution of said second set of pixels is one pixel in each ten pixels from said first set of pixels.

15. The method of manufacturing an identification card of claim 13, wherein said pattern of said second set of pixels includes a first group of pixels representing a start position and a second group of pixels representing an end position and a distribution of code pixels in a pattern between said first and second group of pixels.

* * * * *